United States Patent
Takahara et al.

(10) Patent No.: US 11,048,227 B2
(45) Date of Patent: Jun. 29, 2021

(54) ABNORMALITY DETECTION DEVICE OF MACHINE TOOL

(71) Applicants: FANUC Corporation, Tamanashi (JP); RICOH COMPANY, LTD., Tokyo (JP)

(72) Inventors: Tetsushi Takahara, Yamanashi (JP); Yasuhiro Nakahama, Yamanashi (JP); Shinji Okuda, Yamanashi (JP); Junichi Takami, Tokyo (JP)

(73) Assignees: FANUC CORPORATION, Yamanashi (JP); RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 16/361,208

(22) Filed: Mar. 22, 2019

(65) Prior Publication Data

US 2019/0294144 A1  Sep. 26, 2019

(30) Foreign Application Priority Data

Mar. 23, 2018  (JP) .............................. JP2018-057217

(51) Int. Cl.
*G05B 19/4065* (2006.01)
*G05B 23/02* (2006.01)

(52) U.S. Cl.
CPC ..... *G05B 19/4065* (2013.01); *G05B 23/0221* (2013.01)

(58) Field of Classification Search
CPC ........... G05B 19/4065; G05B 23/0221; G01M 13/00
USPC ....................................................... 700/175
See application file for complete search history.

(56) References Cited

U.S. PATENT DOCUMENTS

| | | | | |
|---|---|---|---|---|
| 5,513,113 A | * | 4/1996 | Okada .................. | G05B 19/404 700/179 |
| 2002/0017139 A1 | * | 2/2002 | Kluft .................. | B23Q 17/0971 73/593 |
| 2014/0257717 A1 | * | 9/2014 | Kumazaki .......... | B23Q 17/0961 702/35 |
| 2016/0209828 A1 | | 7/2016 | Saraie et al. | |

(Continued)

FOREIGN PATENT DOCUMENTS

| | | |
|---|---|---|
| JP | H91444 A | 1/1997 |
| JP | 200214721 | 1/2002 |
| JP | 2007272545 A | 10/2007 |

(Continued)

*Primary Examiner* — Kenneth M Lo
*Assistant Examiner* — Michael W Choi
(74) *Attorney, Agent, or Firm* — Hauptman Ham, LLP

(57) ABSTRACT

Provided is an abnormality detection device with which an abnormality of a machining state of a machine tool can be detected based on information on a section where machining is actually performed in machine tool-based machining. The abnormality detection device detects an abnormality of a machining state of a machine tool machining a workpiece with a tool. The machine tool includes a determination unit determining the machining state by using information related to an actual cutting section in the tool-based machining of the workpiece in the machine tool. The determination unit performs the machining state determination by using a deviation in position and length of a section recognized as the actual cutting section and a physical quantity in the actual cutting section acquired from the machine tool.

14 Claims, 2 Drawing Sheets

(56) References Cited

U.S. PATENT DOCUMENTS

2018/0356282 A1    12/2018    Fukuda et al.

FOREIGN PATENT DOCUMENTS

| | | |
|---|---|---|
| JP | 2008188694 A | 8/2008 |
| JP | 2016133870 A | 7/2016 |
| JP | 2017-120622 A | 7/2017 |
| JP | 2018-156652 A | 10/2018 |
| WO | 2018/169069 A1 | 9/2018 |

* cited by examiner

ABNORMALITY DETECTION DEVICE OF MACHINE TOOL

RELATED APPLICATION

The present application claims priority to Japanese Application Number 2018-057217 filed Mar. 23, 2018, the disclosure of which is hereby incorporated by reference herein in its entirety.

BACKGROUND OF THE INVENTION

1. Field of the Invention

The present disclosure relates to a machining state abnormality detection device.

2. Description of the Related Art

Poor machining occurs during machine tool-based machining due to tool wear and breakage, erroneous workpiece attachment, erroneous program and offset setting, disturbance, and so on. In some cases, poor machining occurs due to re-machining of an already machined workpiece. None of these can be regarded as a normal machining state, and it is desired to be capable of determining the occurrence of the poor machining beforehand by detecting the machining state abnormalities.

JP 2017-120622 A discloses an example of machining state abnormality detection techniques according to the related art. According so JP 2017-120622 A, the state of a tool is determined from physical quantity detection information corresponding to individual periods based on context information and the quality information is output.

Although the tool state is detected by means of the detection information detected during workpiece machining with the technique disclosed in JP 6156566 B2, the technique is problematic in that it is impossible to discriminate machining state abnormalities such as erroneous workpiece attachment, erroneous program and offset setting, and re-machining of an already machined workpiece.

SUMMARY OF THE INVENTION

An object of the present disclosure is to provide an abnormality detection device capable of detecting an abnormality of a machining state of a machine tool based on information on a section where machining is actually performed.

In the abnormality detection device of the present disclosure, a section where cutting feed is performed in a machining program is acquired from a machine signal, CNC information, or the like. At the same time, a section (actual cutting section) where cutting is actually performed in the cutting feed section is recognized from, for example, an acquired motor speed or current and a machine vibration or an audible machine sound. By means of comparison with a pattern of a normal actual cutting section of usual machining, it is possible to detect an abnormal state and estimate what type of abnormality is occurring from the detected pattern. Alarm stop and warning notification are performed in accordance with the urgency or accuracy of the abnormal state.

An abnormality detection device according to an aspect of the present disclosure detects an abnormality of a machining state of a machine tool machining a workpiece with a tool. The abnormality detection device discriminates the type of the abnormality by using actual cutting section information in the tool-based machining of the workpiece in the machine tool.

An abnormality detection program according to another aspect of the present disclosure causes a device to execute processing for detecting an abnormality of a machining state of a machine tool machining a workpiece with a tool. The abnormality detection program causes the device to execute determination processing for determining the machining state by using information related to an actual cutting section in the tool-based machining of the workpiece in the machine tool.

With the present disclosure, it is possible to detect poor machining, which has been confirmed by post-machining external inspection, intra-machine measurement during machining, and so on, without using any special measuring device or the like and without taking time.

BRIEF DESCRIPTION OF THE DRAWINGS

The above-described and other objects and features of the present disclosure will become apparent from the following description of an example with reference to accompanying drawings, in which.

DETAILED DESCRIPTION OF THE PREFERRED EMBODIMENTS

Hereinafter, an embodiment of the present disclosure will be described with reference to the accompanying drawings.

Figure 1:
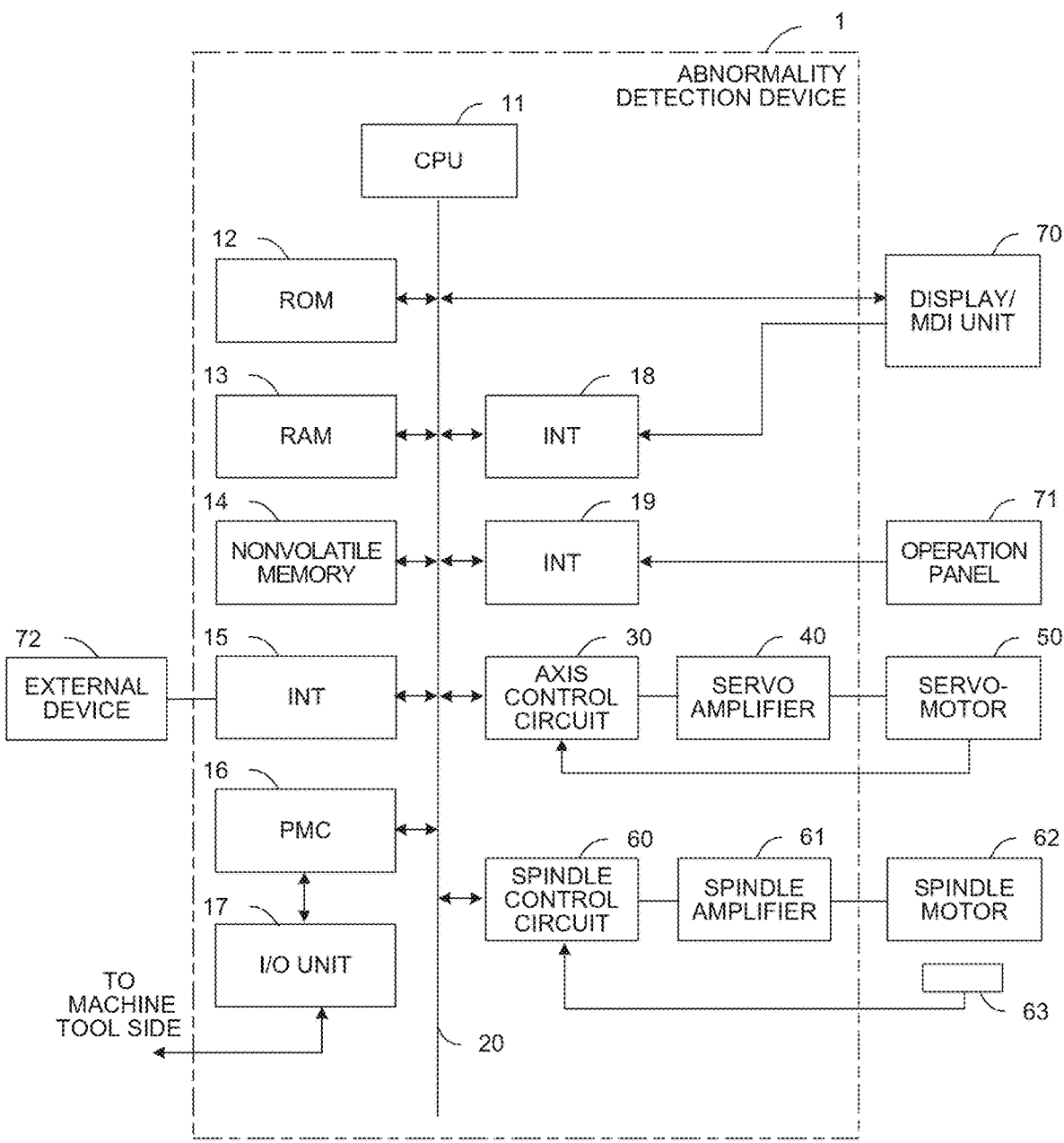
FIG. 1 is a schematic hardware configuration diagram of an abnormality detection device according to a first embodiment.

FIG. 1 is a schematic hardware configuration diagram illustrating a main part of an abnormality detection device according to an embodiment of the present disclosure. An abnormality detection device 1 can be implemented as a machine tool controller. In addition, the abnormality detection device 1 can be implemented as a computer such as a personal computer installed along with a machine tool controller and a cell computer, a host computer, or a cloud server connected to a controller via a network. Illustrated in FIG. 1 as an example is a case where the abnormality detection device 1 is implemented as a machine tool controller.

A CPU 11 of the abnormality detection device 1 according to the present embodiment is a processor that controls the abnormality detection device 1 as a whole. The CPU 11 reads a system program stored in a ROM 12 via a bus 20 and controls the entire abnormality detection device 1 in accordance with the system program. Temporarily stored in a RAM 13 are, for example, temporary calculation data and display data and various data input by an operator via an input unit (not illustrated).

A nonvolatile memory 14 is configured as a memory. Even when the abnormality detection device 1 is off, the storage state of the memory is maintained by, for example, the memory being backed up with a battery (not illustrated). The nonvolatile memory 14 stores a machining program read from an external device 72 via an interface 15, a machining program input via a display/MDI unit 70, and various data acquired from each part of the abnormality detection device 1 and a machine tool (such as various signals, numerical control information, vibrations and sounds generated during machining and acquired by sensors such as an acceleration sensor and an acoustic sensor, current and voltage values of a motor or the like, machining conditions, tool and workpiece information, and the position and speed of each axis of a machine tool). The machining program and various data stored in the nonvolatile memory 14 may be developed in the RAM 13 during execution or use. In addition, various system programs such as a known analysis program are written in advance in the ROM 12.

The interface 15 is an interface for interconnecting the abnormality detection device 1 and the external device 72 such as an adapter. A program, various parameters, and the like are read from the external device 72 side In addition, the program, various parameters, and the like can be stored in external storage means via the external device 72 after editing in the abnormality detection device 1. A programmable machine controller (PMC) 16 outputs a signal via an I/O unit 17 to a machine tool and a peripheral device of the machine tool based on a built-in sequence program of the abnormality detection device 1 and performs control (examples of the peripheral device including an actuator such as a robot hand for tool exchange). In addition, the PMC 16 receives signals from, for example, various switches of an operation panel provided in the main body of a machine tool, performs necessary signal processing, and then hands the processed signals over to the CPU 11.

The display/MDI unit 70 is a manual data input device including a display and a keyboard. An interface 18 receives a command and data from the keyboard of the display/MDI unit 70 and gives the command and data to the CPU 11. An interface 19 is connected to an operation panel 71 including a manual pulse generator used during manual driving of each axis.

An axis control circuit 30 for controlling an axis of a machine tool receives an axis movement command quantity from the CPU 11 and outputs an axis command to a servo amplifier 40. The servo amplifier 40 drives a servomotor 50, which moves the axis of the machine tool, in response to the command. The servomotor 50 for the axis incorporates a position and speed detector and performs position and speed feedback control by feeding a position and speed feedback signal from the position and speed detector back to the axis control circuit 30.

Although one axis control circuit 30, one servo amplifier 40, and one servomotor 50 are illustrated in the hardware configuration diagram of FIG. 1, the axis control circuit 30, the servo amplifier 40, and the servomotor 50 that are to be actually prepared are equal in number to the axes of a machine tool to be controlled.

A spindle control circuit 60 receives a spindle rotation command to a manufacturing machine and outputs a spindle speed signal to a spindle amplifier 61. In response to the spindle speed signal, the spindle amplifier 61 rotates a spindle motor 62 of the manufacturing machine at the commanded rotation speed and drives a tool. A position coder 63 is coupled to the spindle motor 62. The position coder 63 outputs a return pulse in synchronization with spindle rotation. The return pulse is read by the CPU 11.

Figure 2:
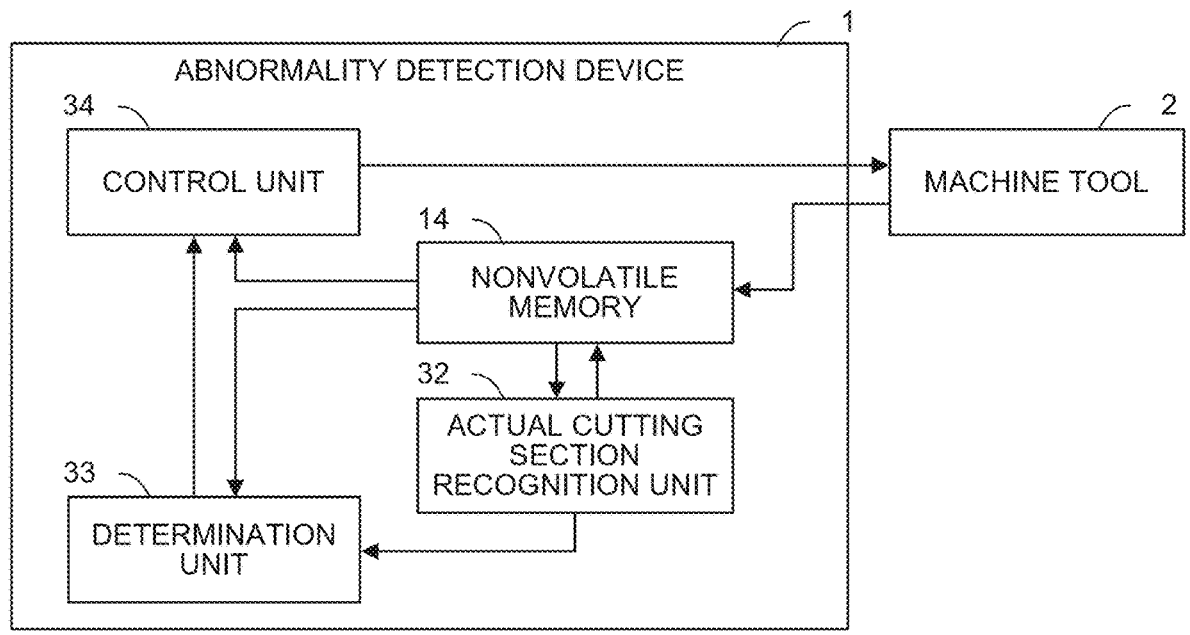
FIG. 2 is a schematic functional block diagram of the abnormality detection device according to the first embodiment.

FIG. 2 is a schematic functional block diagram of the abnormality detection device 1 according to a first embodiment. The functional blocks that are illustrated in FIG. 2 are realized by the CPU 11 of the abnormality detection device 1 illustrated in FIG. 1 executing respective system programs and controlling the operations of respective parts of the abnormality detection device 1.

The abnormality detection device 1 of the present embodiment is provided with an actual cutting section recognition unit 32 and a control unit 34. The actual cutting section recognition unit 32 recognizes an actual cutting section (section where cutting is actually performed in a cutting feed section) based on data acquired from each part of the abnormality detection device 1 and a machine tool 2 (and stored in the nonvolatile memory 14). The control unit 34 controls (the servomotor 50 and the spindle motor 62 of) the machine tool 2 or outputs a warning or the like based on a machining state determination result output from a determination unit 33 or a machining program.

The actual cutting section recognition unit 32 is functional means for recognizing the actual cutting section based on information on a currently executed machining program or physical quantities such as the vibration and sound acquired from the machine tool 2, the speed, current value, positron, and torque value of the servomotor 50, and the speed and current value of the spindle motor 62. In general, air cut or the like is present even during execution of a block that commands cutting feed of a machining program, and thus the execution section is not entirely the actual cutting section. Accordingly, the actual cutting section recognition unit 32 recognizes the actual cutting section based on a change in the physical quantity such as the speed, current value, position, and torque value of the servomotor 50, the speed and current value of the spindle motor 62, and the vibration and sound acquired from the machine tool 2 in the midst of cutting feed (that can be acquired from a signal indicating that cutting feed is in progress and control-related information such as information on a block in execution). The actual cutting section recognition unit 32 may store information related to the recognized actual cutting section (such as the time range of the actual cutting section) in the nonvolatile memory 14 or the like.

As an example, the actual cutting section recognition unit 32 may extract frequency components from the physical quantities such as the vibration and sound acquired from the machine tool 2 and, in the event of a change in extracted main frequency component, the actual cutting section recognition unit 32 may recognize the section where the change occurred as the actual cutting section. Regarding the physical quantity acquired from the machine tool 2 in a case where the machine tool 2 operates normally, an experiment or the like may be carried out in advance for acquisition of physical quantities in the case of air cut and the case of the actual cutting section, respective frequency components may be extracted, and the actual cutting section may be extracted based on which frequency component is similar to the frequency component of the physical quantity acquired when the machine tool 2 is operated. In this case, the frequency component of the physical quantity in the midst of machining based on workpiece-tool contact depends on the material of the workpiece and the type of the tool (type of the machining), and thus it is preferable to store the frequency component of the physical quantity generated in the actual cutting section in each combination.

In a case where the actual cutting section recognition unit 32 is configured more simply, a section where the current value, torque value, or the like of a motor exceeded a predetermined threshold value may be recognized as the actual cutting section in view of the fact that the torque value of the motor or the like shows a large value in the actual cutting section and in view of the magnitude of the physical quantity at a time when machining based on workpiece-tool contact was performed.

As another example, the actual cutting section recognition unit 32 may recognize the actual cutting section by using a classifier, which may be created for classification between the actual cutting section and a non-actual cutting section based on a prior experiment and the vibration and sound acquired from the machine tool 2, the current value of the motor, and so on. A known cluster classifier, a neural network, or the like may be used as the classifier.

The actual cutting section recognition unit 32 may recognize the actual cutting section by any method insofar as the actual cutting section recognition unit 32 is capable of recognizing the actual cutting section based on information acquired from the machine tool 2 as described above. The actual cutting section is a section where machining is actually performed with a tool and a workpiece in contact with each other.

The determination unit 33 is functional means for determining the machining state in the machine tool 2 based on the actual cutting section determined by the actual cutting section recognition unit 32. The determination unit 33 may determine the state of the machining performed in the machine tool 2 based on the position of the actual cutting section recognized by the actual cutting section recognition unit 32 or the physical quantity such as the speed, current value, position, and torque value of the servomotor 50, the speed and current value of the spindle motor 62, and the vibration and sound acquired in the actual cutting section of the machining in the machine tool 2.

The determination unit 33 may determine the state of the machining performed in the machine tool 2 based on the position of the actual cutting section recognized by the actual cutting section recognition unit 32 by the following method as an example. According to the method, the position (initiation and termination positions) of the actual cutting section recognized by the actual cutting section recognition unit 32 in a machining state where the machine tool 2 is normal is pre-stored in the nonvolatile memory 14 in association with each machining program block. In a case where the difference between the position and the length of the section exceeds a predetermined threshold value (allowable error), the determination unit 33 may determine that the machining state is abnormal.

Figure 3:
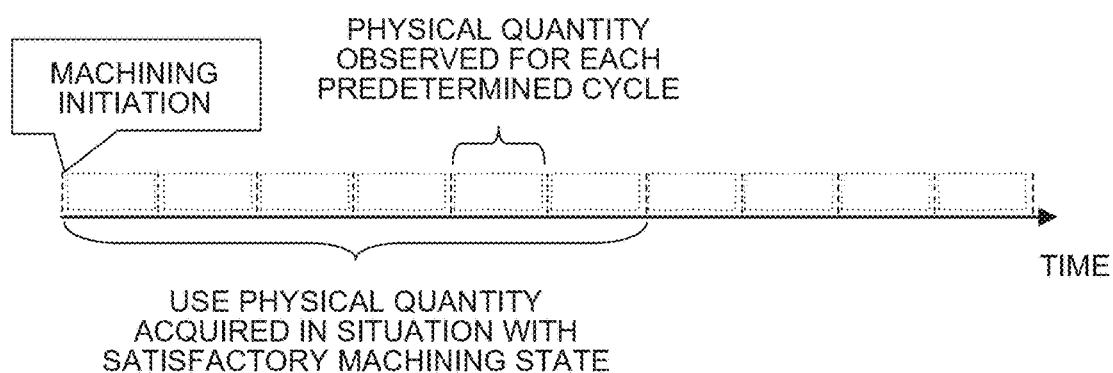
FIG. 3 is a diagram exemplifying a method for acquiring an actual cutting section and a physical quantity in a normal machining state from a machine tool.

The determination unit 33 may determine that the machining performed in the machine tool 2 is in an abnormal state in a case where a deviation is detected in the physical quantity acquired in the actual cutting section recognized by the actual cutting section recognition unit 32 as compared with the physical quantity of the actual cutting section acquired from the machine tool 2 in a normal machining state and pre-stored in the nonvolatile memory 14. In this case, outlier verification related to, for example, the frequency component and magnitude of the physical quantity may be used for the determination unit 33 to determine the deviation of the physical quantity acquired in the actual cutting section recognized by the actual cutting section recognition unit 32 with respect to the physical quantity of the actual cutting section acquired from the machine tool 2 in the normal machining state and pre-stored in the nonvolatile memory 14. In a case where a statistical method such as the outlier verification is used for the machining state determination, for example, the physical quantity such as the vibration and sound in the actual cutting section, the speed, current value, position, and torque value of the servomotor 50, and the speed and current value of the spindle motor 62 is acquired from the machine tool 2 for each predetermined cycle for a while after initiation of the workpiece machining by the machine tool 2 as exemplified in FIG. 3, the acquired physical quantity is stored in the nonvolatile memory 14 as a physical quantity acquired in a situation with a satisfactory machining state, and the machining state determination is performed by means of the stored physical quantity. Preferably, the storage of the physical quantity acquired in the situation with the satisfactory machining state and stored in the nonvolatile memory 14 is equivalent in number to the extent to which the statistical processing can be performed.

The determination unit 33 may determine the degree of the abnormality as well instead of simply determining whether the state of the machining performed in the machine tool 2 is normal or abnormal. In this case, threshold values that the determination unit 33 uses in determining the state of the machining of the machine tool 2 (such as a threshold value for determining the position and length of the actual cutting section and a threshold value used when an outlier determination is made as a result of the outlier verification) may be prepared in a plurality of stages and the degree (mild, moderate, severe, and so on) of the abnormality may be determined based on which threshold value was exceeded.

The determination unit 33 may determine the cause of the abnormality in the event of the abnormality. For example, the determination unit 33 is capable of determining the cause of the abnormality based on how the position or length of the actual cutting section recognized by the actual cutting section recognition unit 32 deviates from the position of the actual cutting section recognized by the actual cutting section recognition unit 32 in the normal machining state. In a case where the initiation position of the actual cutting section deviates, the determination unit 33 is capable of determining that poor workpiece attachment or a jig problem has occurred. In the event of a consistently backward initiation position of the actual cutting section, the determination unit 33 is capable of determining that a tool s missing. The determination unit 33 is capable of determining that a workpiece is absent or double machining or the like has occurred in a case where it can be determined that tool breakage has occurred during machining by only the termination position of the actual cutting section deviating forward and the actual cutting section is extremely short or is not recognized.

In a case where the determination unit 33 determines the cause of the abnormality in the machining performed in the machine tool 2, the determination unit 33 may use, as determination conditions, the numerical control information that can be acquired from the control unit 34 and a machining program that is executed in addition to the actual cutting section recognized by the actual cutting section recognition unit 32 and the physical quantity of the machine tool 2 acquired in the actual cutting section.

The control unit 34 is functional means for controlling the workpiece machining by the machine tool 2 based on a machining program and performing warning output or the like and stop control on the machine tool 2 based on the machining state determination result output from the determination unit 33. In a case where the determination unit 33 performs output to the effect that the current machining state is abnormal, for example, the control unit 34 may command each part of the abnormality detection device 1 or the machine tool 2 to issue a warning. In addition, the control unit 34 may perform control such that the machining currently performed by the machine tool 2 is stopped in a case where the determination unit 33 performs output to the effect that the current machining state is abnormal. In addition, the control unit 34 may output the result of the determination by the determination unit 33 to, for example, an external computing device such as a cell computer, a host computer, and a cloud server via an interface (not illustrated).

In a case where the determination unit 33 determines and outputs the degree of the abnormality of the current machining state, for example, the control unit 34 may perform different operations in accordance with the degree of the abnormality output by the determination unit 33. For example, in a case where the current machining state output by the determination unit 33 is a mild abnormality, the control unit 34 may output only a warning to that effect. In a case where the current machining state output by the determination unit 33 is a severe abnormality, the control unit 34 may perform stop control on the machine tool 2 in accordance with warning output.

Although an embodiment of the present disclosure has been described above, the present disclosure is not limited only to the example of the above-described embodiment. The present disclosure can be implemented in various forms by being appropriately changed.

In the embodiment described above, the actual cutting section recognition unit 32 and the determination unit 33 are provided in the abnormality detection device 1. In an alternative example, at least one of the actual cutting section recognition unit 32 and the determination unit 33 may be provided on a computer such as a cell computer, a host computer, and a cloud server. For example, in a factory where a plurality of the machine tools 2 are installed, the operations of the machine tools 2 can be efficiently managed by a configuration being adopted in which the actual cutting section recognition unit 32 is provided on a controller controlling each of the machine tools 2, the determination unit 33 is provided on a host computer managing the operations of the machine tools 2, and the machining states of the machine tools 2 are determined by the single determination unit 33.

Although an embodiment of the present disclosure has been described above, the present disclosure is not limited to the example of the above-described embodiment. The present disclosure can be implemented in other forms by being appropriately changed.

The invention claimed is:

1. An abnormality detection device for detecting an abnormality of a machining state of a machine tool machining a workpiece with a tool, the abnormality detection device comprising:
 a processor configured to
  determine the machining state by using information related to an actual cutting section, wherein
   the actual cutting section is a section where machining is actually performed with the tool and the workpiece in contact with each other, and
   the information includes a difference between at least one of an initiation position or a termination position of the actual cutting section acquired during the machining by the machine tool and at least one of an initiation position or a termination position of the actual cutting section acquired during the machining by the machine tool in a normal machining state, respectively, and
  in response to detecting the abnormality of the machining state corresponding to the difference exceeding a predetermined threshold value, perform warning output and further cause the machining by the machine tool to be stopped.

2. The abnormality detection device according to claim 1, wherein
 the processor is configured to output a result of the determined machining state to the machine tool or an external computing device.

3. The abnormality detection device according to claim 1, wherein
 the processor is configured to determine a degree of the abnormality of the machining state.

4. The abnormality detection device according to claim 1, wherein
 the processor is further configured to determine the machining state by verifying whether or not a physical quantity in the actual cutting section acquired during the machining in the machine tool is an outlier with respect to the physical quantity in the actual cutting section acquired in the normal machining state.

5. The abnormality detection device according to claim 1, wherein
 the processor is further configured to determine a cause of the abnormality of the machining state.

6. The abnormality detection device according to claim 1, wherein
 the processor is configured to, in response to the initiation position of the actual cutting section acquired during the machining in the machine tool deviating from the initiation position of the actual cutting section acquired in the normal machining state,
  determine an occurrence of a poor workpiece attachment or a jig problem.

7. The abnormality detection device according to claim 1, wherein
 the processor is configured to, in response to the initiation position of the actual cutting section acquired during the machining in the machine tool being consistently backward with respect to the initiation position of the actual cutting section acquired in the normal machining state,
  determine an absence of the machine tool.

8. The abnormality detection device according to claim 1, wherein
 the processor is configured to, in response to the termination position of the actual cutting section acquired during the machining in the machine tool being forward with respect to the termination position of the actual cutting section acquired in the normal machining state,
  determine an occurrence of a breakage of the machine tool.

9. The abnormality detection device according to claim 1, wherein
 the processor is configured to, in response to the actual cutting section being shorter than a predetermined length or not being recognized,
  determine an absence or double machining of the workpiece.

10. A non-transitory computer readable storage medium storing an abnormality detection program for detecting an abnormality of a machining state of a machine tool machining a workpiece with a tool, wherein the abnormality detection program, when executed by a computer, causes the computer to execute:
 determining the machining state by using information related to an actual cutting section, wherein
  the actual cutting section is a section where machining is actually performed with the tool and the workpiece in contact with each other, and the information includes a difference between at least one of an initiation position or a termination position of the actual cutting section acquired during the machining by the machine tool and at least one of an initiation position or a termination position of the actual cutting section acquired during the machining by the machine tool in a normal machining state, respectively, and in response to detecting the abnormality of the machining state corresponding to the difference exceeding a predetermined threshold value, performing warning output and further stopping the machining by the machine tool.

11. The non-transitory computer readable storage medium according to claim 10, wherein the abnormality detection program, when executed by the computer, causes the computer to execute:

in response to the initiation position of the actual cutting section acquired during the machining in the machine tool deviating from the initiation position of the actual cutting section acquired in the normal machining state,
determining an occurrence of a poor workpiece attachment or a jig problem.

12. The non-transitory computer readable storage medium according to claim 10, wherein the abnormality detection program, when executed by the computer, causes the computer to execute:

in response to the initiation position of the actual cutting section acquired during the machining in the machine tool being consistently backward with respect to the initiation position of the actual cutting section acquired in the normal machining state,
determining an absence of the machine tool.

13. The non-transitory computer readable storage medium according to claim 10, wherein the abnormality detection program, when executed by the computer, causes the computer to execute:

in response to the termination position of the actual cutting section acquired during the machining in the machine tool being forward with respect to the termination position of the actual cutting section acquired in the normal machining state,
determining an occurrence of a breakage of the machine tool.

14. The non-transitory computer readable storage medium according to claim 10, wherein the abnormality detection program, when executed by the computer, causes the computer to execute:

in response to the actual cutting section being shorter than a predetermined length or not being recognized,
determining an absence or double machining of the workpiece.

* * * * *